UNITED STATES PATENT OFFICE.

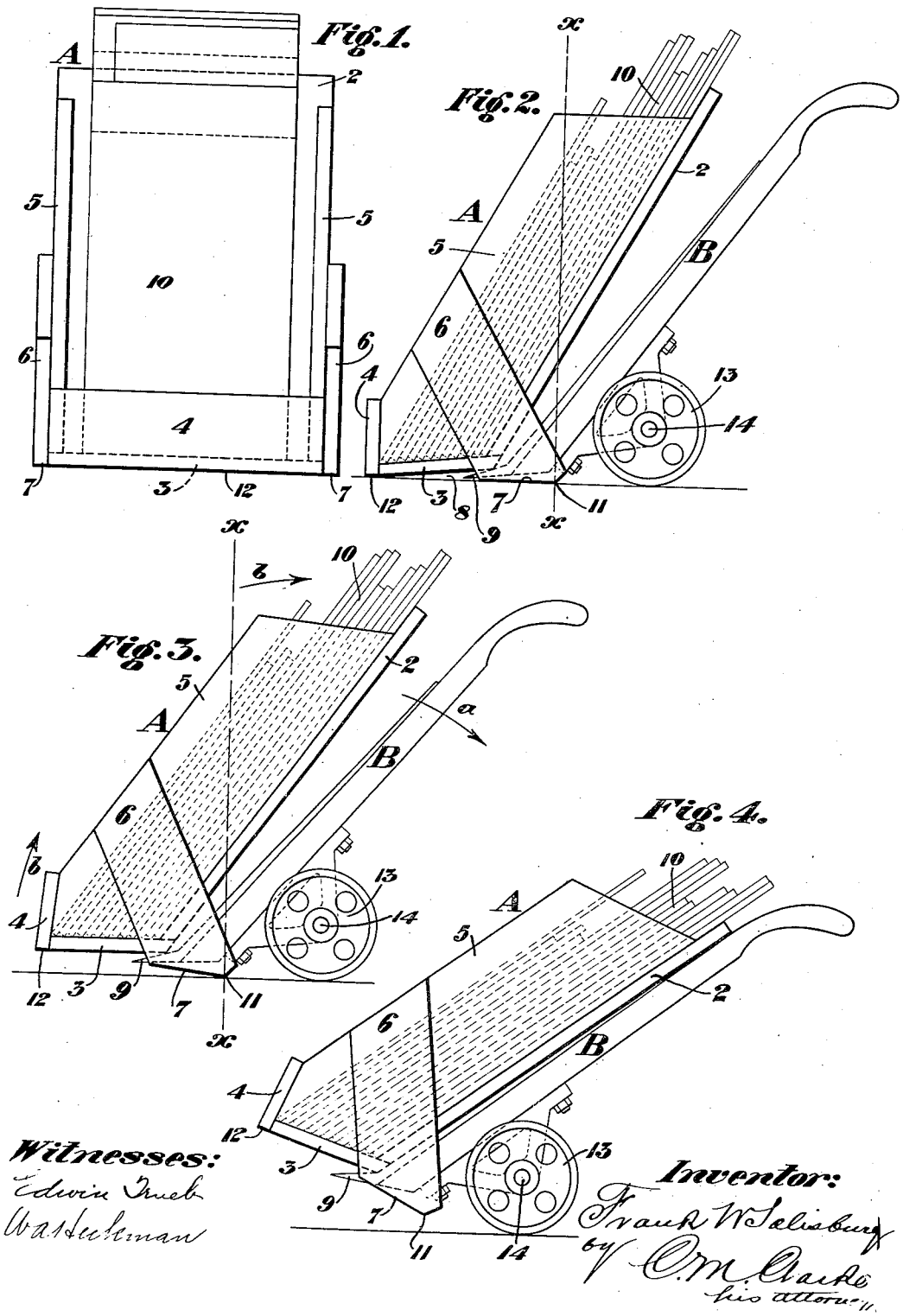

FRANK W. SALISBURY, OF JAMES CITY, PENNSYLVANIA, ASSIGNOR TO AMERICAN PLATE GLASS COMPANY, OF KANE, PENNSYLVANIA, A CORPORATION OF NEW JERSEY.

PORTABLE COLLECTING-BOX.

1,215,718. Specification of Letters Patent. Patented Feb. 13, 1917.

Application filed November 26, 1915. Serial No. 63,351.

*To all whom it may concern:*

Be it known that I, FRANK W. SALISBURY, a citizen of the United States, residing at James City, in the county of Elk and State of Pennsylvania, have invented certain new and useful Improvements in Portable Collecting-Boxes, of which the following is a specification.

My invention consists of an improvement in portable boxes or crates adapted for use in the collection and transportation of flat material such as plate glass, metal, etc., and has for its object to provide a device of this character which may be set in erected position upon a factory floor, easily and quickly tilted into a supported position upon a truck, moved thereon, and as easily discharged therefrom, with its contents.

In the handling of plate glass, metal, or any similar flat material, especially of various sizes, and in the sorting or assemblage of the same for packing and shipment, the several pieces, which are usually of considerable weight, have ordinarily been collected and transferred from one place to another, in a factory or shop, by hand. Especially in the plate glass industry, where the ware is quite heavy and requires considerable care in handling and moving around the factory, or cutting or packing room, these operations are somewhat tedious and laborious, and involve considerable re-handling at different locations.

My improvement has in view to provide a box capable of being set upon the factory floor in an inclined erected position, adapted to receive its load of plates, and is so constructed as to its supporting bottom as to permit the insertion below it of the front edge or plow of an ordinary hand truck, and to facilitate the backward tilting of the box upon its own rear legs backwardly upon the truck, continued tilting movement of the truck itself upon its wheels then lifting the entire box and its pedestals clear from the floor, whereby it may be moved by the truck over the floor to any desired position, and again set upon the floor for discharge of its contents, and the truck removed.

In constructing the invention, which may be of various sizes or capacities, depending on the work in view, it must be so proportioned and designed as to insure the distribution of the weight of the box itself, and also of its contents, slightly more at one side of the normal center of gravity than the other side, so that upon tilting by the truck the weight of both may be utilized to overbalance the box beyond the center of gravity, toward the truck, whereby to first tilt it upwardly on its own rear pedestals toward the truck, and to then be entirely lifted and supported by the truck itself.

A preferred embodiment of the invention is illustrated in the accompanying drawing, in which—

Figure 1 is a face view of the box in erected position on the factory floor.

Fig. 2 is a side view of the box, and also showing the initial position of the truck in connection therewith.

Fig. 3 is a similar view, showing the tilting action of the box upon its own pedestals as actuated by the truck.

Fig. 4 shows the box completely tilted over upon the truck and raised free from the floor for transportation thereover upon the truck.

The box A is of generally rectangular construction as to its main portions, having a back 2, a bottom 3, and front 4, which is comparatively shallow in depth; sides 5, 5, and rearwardly extending pedestals or legs 6, 6. The latter are secured upon the sides 5 in any suitable manner, as by screws or nails, and extend rearwardly, bearing by their chamfered bottoms 7 or a portion thereof upon the floor, when the box is in normal position, as shown in Figs. 1 and 2. The bottom 3 also rests by its front edge 12 upon the floor, but slopes backwardly at a slightly increasing elevation, as shown, leaving a wedge-shaped space 8 intervening between it and the floor, widest at its rear portion, and providing ample opportunity for the insertion, between the floor and the rear portion of the bottom, of the plow 9 of the truck B.

The back 2, in normal erected position, slopes backwardly and upwardly at a decided inclination from the vertical, the sides 5, 5, being correspondingly arranged, so that the ware 10, which may be plate glass, metal or other similar material, may be loaded in successive layers at a corresponding inclination upon the back 2, resting thereagainst.

The proportions of the box, as stated above, are so arranged that when loaded the weight of the box and its contents will be distributed at each side of the normal center of gravity, but preponderating at one side of a transverse vertical plane $x, x$, passing through the upper portion of the box and its contents, and the rear heels 11 of the pedestal 6. The preponderance of weight of the box, or of the box and its contents, when loaded, should always be at the side of the line $x, x$, toward the bottom 3 and its outer bearing edge 12, so as to insure stability upon the floor during the loading or unloading operation.

The distribution of the weight of the box and its contents, however, is to a large extent on the rear side of plane $x, x$, only sufficiently less than the remaining weight on the front side of said plane, whereby to insure a forward overbalance when in normal position but to admit of easy tipping backwardly of the box upon the pivoting terminals 11 of the pedestals.

By this construction, when the plow 9 of truck B is inserted, as shown in Fig. 2, and the truck B is thrown backwardly in the direction of arrow $a$ (Fig. 3) upon its supporting wheels 13, the bottom of the box and the entire box and its contents may be easily lifted and tilted upwardly and backwardly on the heels 11, the box taking the movement indicated by the arrows $b$.

Upon further movement of the truck backwardly to normal wheeling position, the box will easily and quietly continue its backward tilting movement, eventually resting upon the truck, which, by its leverage action upon the wheels 13, by its axle 14, will then bodily lift the lower portion of the box, with its pedestals, raising the bearing terminals or heels 11 upwardly away from contact with the floor, thereby freeing the box entirely, so that it may be transported upon the truck to any desired location (Fig. 4). Thereupon, upon reversing the tilting movement of the truck B in the usual way, pedestal terminals 11 will first come into contact with the floor, and the front edge 12 may then be lowered so as to release the box and leave it in a normal position of rest, as in Fig. 1, whereupon the truck B may be easily withdrawn, as will be readily understood.

The construction, operation and advantages of the invention will be readily appreciated by all those familiar with the manual handling, transportation, assorting, assemblage and packing of plate glass or metal or other various similar material. It enables the workmen to locate the box at any desired position in the factory, and there collect and load the box with the same or different sizes of ware, and to quickly transport the same to any desired portion of the plant, for packing, redistribution, etc.

The device may be easily and cheaply constructed of wood, sheet metal, or other similar material, and may be variously modified or changed in construction, design, or different details by the skilled mechanic within the scope of the following claims.

What I claim is:

1. An open front box having a rear upwardly and backwardly inclined wall, an upwardly and backwardly inclined bottom, and rearwardly located pedestals supporting the back portion of the bottom away from the floor and having terminals providing tilting bearings for the box backwardly beyond its center of gravity.

2. An open-front box having a rear upwardly and backwardly inclined wall, an upwardly and backwardly inclined bottom adapted to rest upon the floor by its front edge portion, and rearwardly located pedestals having supporting and pivoting terminals extending to a transverse plane slightly beyond the center of gravity of the box.

3. An open-front box having a pocketed bottom portion within and formed by a rearwardly and upwardly sloping back and a rearwardly and upwardly sloping bottom, vertically arranged sides, and a low front wall; and having at each side supporting and pivoting pedestals terminating backwardly of the center of gravity of the box.

4. In an open-front box for the purpose described, in combination, a rearwardly inclined back wall, a bottom adapted to rest upon the floor by its front edge and sloping upwardly with a slight diverging clearance space to the lower edge of the back wall, vertically arranged backwardly disposed sides, a comparatively narrow front wall secured to the sides and bottom, and supporting and pivoting pedestals secured to the box and having supporting terminals extending rearwardly beyond the normal center of gravity of the box.

In testimony whereof I hereunto affix my signature in the presence of two witnesses.

FRANK W. SALISBURY.

Witnesses:
J. A. DUNSMORE,
S. K. FOOTE, Sr.